United States Patent
No et al.

(10) Patent No.: US 11,671,239 B2
(45) Date of Patent: Jun. 6, 2023

(54) ENCRYPTION METHOD AND APPARATUS BASED ON HOMOMORPHIC ENCRYPTION USING ODD FUNCTION PROPERTY

(71) Applicants: SAMSUNG ELECTRONICS CO., LTD., Suwon-si (KR); SNU R&DB FOUNDATION, Seoul (KR); Industry-Academic Cooperation Foundation, Chosun University, Gwangju (KR)

(72) Inventors: Jung-Seon No, Seoul (KR); Joonwoo Lee, Seoul (KR); Young-Sik Kim, Gwangju (KR); Youngwoo Lee, Seoul (KR); Eunsang Lee, Seoul (KR)

(73) Assignees: SAMSUNG ELECTRONICS CO., LTD., Suwon-si (KR); SNU R&DB FOUNDATION, Seoul (KR); Industry-Academic Cooperation Foundation, Chosun University, Gwangju (KR)

( * ) Notice: Subject to any disclaimer, the term of this patent is extended or adjusted under 35 U.S.C. 154(b) by 58 days.

(21) Appl. No.: 17/192,162

(22) Filed: Mar. 4, 2021

(65) Prior Publication Data
US 2021/0351912 A1  Nov. 11, 2021

Related U.S. Application Data

(60) Provisional application No. 63/021,761, filed on May 8, 2020.

(30) Foreign Application Priority Data

Oct. 26, 2020 (KR) .................. 10-2020-0139479

(51) Int. Cl.
*H04L 9/00* (2022.01)

(52) U.S. Cl.
CPC .................. *H04L 9/008* (2013.01)

(58) Field of Classification Search
CPC ... H04L 9/008; H04L 9/0618; H04L 2209/12; G06F 7/548
See application file for complete search history.

(56) References Cited

U.S. PATENT DOCUMENTS

| 9,946,970 B2 | 4/2018 | Gilad-Bachrach et al. |
| 10,594,472 B2 | 3/2020 | Ding |

(Continued)

FOREIGN PATENT DOCUMENTS

| CN | 109412786 A | 3/2019 |
| EP | 2 237 474 A1 | 10/2010 |

(Continued)

OTHER PUBLICATIONS

Alperin-Sheriff, Jacob, and Chris Peikert. "Faster bootstrapping with polynomial error." Annual Cryptology Conference. Springer, Berlin, Heidelberg, 2014. (Year: 2014).*

(Continued)

*Primary Examiner* — Vu V Tran
(74) *Attorney, Agent, or Firm* — NSIP Law

(57) ABSTRACT

An encryption method and apparatus based on homomorphic encryption using an odd function property. The encryption method includes generating a ciphertext by encrypting data, and bootstrapping the ciphertext by performing a modular reduction based on an odd function property for a modulus corresponding to the ciphertext.

15 Claims, 4 Drawing Sheets

(56) References Cited

U.S. PATENT DOCUMENTS

| | | | |
|---|---|---|---|
| 10,644,877 B2 | 5/2020 | Khedr et al. | |
| 2013/0170640 A1* | 7/2013 | Gentry | H04L 9/008 |
| | | | 380/30 |
| 2014/0177828 A1* | 6/2014 | Loftus | H04L 9/0852 |
| | | | 380/44 |
| 2019/0065974 A1 | 2/2019 | Michigami | |
| 2019/0227771 A1* | 7/2019 | Kitamura | G06F 7/5443 |
| 2019/0334694 A1* | 10/2019 | Chen | H04L 9/008 |
| 2019/0363878 A1 | 11/2019 | Sato et al. | |
| 2020/0228307 A1* | 7/2020 | Cheon | H04L 9/3093 |

FOREIGN PATENT DOCUMENTS

| | | | |
|---|---|---|---|
| JP | 5790471 B2 | 10/2015 | |
| KR | 10-2015-0122513 A | 11/2015 | |
| KR | 10-1600016 B1 | 3/2016 | |
| KR | 10-1608515 B1 | 4/2016 | |
| KR | 10-1618941 B1 | 5/2016 | |
| KR | 10-1861089 B1 | 5/2018 | |
| KR | 10-1919940 B1 | 11/2018 | |
| KR | 10-1965628 B1 | 4/2019 | |
| KR | 10-1971215 B1 | 4/2019 | |
| KR | 10-2019159 B1 | 9/2019 | |
| KR | 10-2040106 B1 | 11/2019 | |
| KR | 10-2040120 B1 | 11/2019 | |
| KR | 10-2020-004702 A | 5/2020 | |

OTHER PUBLICATIONS

Han, Kyoohyung, and Dohyeong Ki. "Better Bootstrapping for Approximate Homomorphic Encryption." *Cryptographers' Track at the RSA Conference*. Springer, Cham, 2020. (26 pages in English).

Cheon, Jung Hee, et al. "Bootstrapping for Approximate Homomorphic Encryption." *Annual International Conference on the Theory and Applications of Cryptographic Techniques*. Springer, Cham, 2018. (21 pages in English).

Chen, Hao, Ilaria Chillotti, and Yongsoo Song. "Improved Bootstrapping for Approximate Homomorphic Encryption." *Annual International Conference on the Theory and Applications of Cryptographic Techniques*. Springer, Cham, 2019. (21 pages in English).

Cheon, Jung Hee, et al. "Homomorphic Encryption for Arithmetic of Approximate Numbers." *International Conference on the Theory and Application of Cryptology and Information Security*. Springer, Cham, 2017. (23 pages in English).

European Search Report dated Aug. 19, 2021 in counterpart European Patent Application No. 21171809.3.

Cheon, Jung Hee, et al. "Privacy-Preserving Computations of Predictive Medical Models with Minimax Approximation and Non-Adjacent Form", International Conference on Image Analysis and Processing, Nov. 19, 2017.

Gentry, Craig, and Shai Halevi. "Implementing Gentry's Fully-Homomorphic Encryption Scheme", Annual International Conference on the Theory and Applications of Cryptographic Techniques, Feb. 4, 2011.

Lee, Yongwoo, et al. "Near-optimal Polynomial for Modulus Reduction Using L2-norm for Approximate Homomorphic Encryption", International Association for Cryptologic Research, Apr. 27, 2020.

* cited by examiner

Algorithm 1

Input : A polynomial of degree $d$, $p = \sum_{i=0}^{d} c_i T_i$, and a real number $t$.
Output: The value of $p(t)$.

1 $k, m \leftarrow$ the integer such that $2^m \cdot k > d \geq 2^{m-1} \cdot k$ and $k \approx \sqrt{d}$ which is even.
2 Evaluate $T_2(t), T_4(t), \cdots, T_{2\lfloor \log k \rfloor}(t)$ using $T_{2i}(t) = 2T_i(t)^2 - 1$.
3 Evaluate $T_3(t), T_5(t), \cdots, T_{k-1}(t)$ inductively.
4 Evaluate $T_k(t)$ inductively and evaluate $T_{2k}(t), T_{4k}(t), \cdots, T_{2^{m-1}k}(t)$ using $T_{2i}(t) = 2T_i(t)^2 - 1$.
5 Find quotient $q$ and remainder $r$ of $p$ divided by $T_{2^{m-1}k}$.
6 if $\deg q < k$ then
7     Evaluate $q(t)$ with $T_1(t), T_2(t), T_3(t), \cdots, T_{k-1}(t)$.
8 else
9     Evaluate $q(t)$ recursively.
10 end
11 if $\deg r < k$ then
12     Evaluate $r(t)$ with $T_1(t), T_2(t), T_3(t), \cdots, T_{k-1}(t)$.
13 else
14     Evaluate $r(t)$ recursively.
15 end
16 Evaluate $p(t) = q(t)T_{2^{m-1}k}(t) + r(t)$.

FIG. 3

ENCRYPTION METHOD AND APPARATUS BASED ON HOMOMORPHIC ENCRYPTION USING ODD FUNCTION PROPERTY

CROSS-REFERENCE TO RELATED APPLICATIONS

This application claims the benefit under 35 USC 119(e) of U.S. Provisional Application No. 63/021,761 filed on May 8, 2020, and the benefit under 35 USC 119(a) of Korean Patent Application No. 10-2020-0139479 filed on Oct. 26, 2020, in the Korean Intellectual Property Office, the entire disclosures of which are incorporated herein by reference for all purposes.

BACKGROUND

1. Field

The following description relates to an encryption method and apparatus based on homomorphic encryption using an odd function property.

2. Description of Related Art

Fully homomorphic encryption is an encryption scheme that enables an arbitrary logical operation or a mathematical operation to be performed on encrypted data. A fully homomorphic encryption method maintains security in data processing.

However, the conventional encryption method is difficult to process encrypted data and thus, inadequate for protecting customer privacy.

Fully homomorphic encryption enables customers to receive many services while preserving privacy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an encryption method using homomorphic encryption includes generating a ciphertext by encrypting data, and bootstrapping the ciphertext by performing a modular reduction based on an odd function property for a modulus corresponding to the ciphertext.

The bootstrapping may include bootstrapping the ciphertext by transforming an approximate polynomial that approximates the modular reduction based on the odd function property.

The bootstrapping of the ciphertext by performing the modular reduction based on the odd function property may include obtaining an approximate polynomial that approximates the modular reduction, generating a transformed approximate polynomial by transforming the approximate polynomial, and performing the modular reduction based on the odd function property and the transformed approximate polynomial.

The generating of the transformed approximate polynomial by transforming the approximate polynomial may include generating the transformed approximate polynomial by reducing a degree of the approximate polynomial.

The generating of the transformed approximate polynomial by reducing the degree of the approximate polynomial may include generating the transformed approximate polynomial to have a domain corresponding to the square of a domain of the approximate polynomial.

The generating of the transformed approximate polynomial by transforming the approximate polynomial may include determining a maximum degree of the transformed approximate polynomial based on a degree of the approximate polynomial, and generating the transformed approximate polynomial by dividing the approximate polynomial based on the maximum degree.

The determining of the maximum degree of the transformed approximate polynomial based on the degree of the approximate polynomial may include determining the maximum degree based on a depth of an operation of the approximate polynomial and a number of nonscalar multiplications for the ciphertext.

The generating of the transformed approximate polynomial by dividing the approximate polynomial based on the maximum degree may include generating the transformed approximate polynomial by dividing the approximate polynomial based on one or more polynomial bases.

The polynomial bases may be the bases of the Chebyshev polynomials.

In another general aspect, an encryption apparatus using homomorphic encryption includes a processor configured to generate a ciphertext by encrypting data, and bootstrap the ciphertext by performing a modular reduction based on an odd function property for a modulus corresponding to the ciphertext, and a memory configured to store instructions to be executed by the processor.

The processor may be configured to bootstrap the ciphertext by transforming an approximate polynomial that approximates the modular reduction based on the odd function property.

The processor may be configured to obtain an approximate polynomial that approximates the modular reduction, generate a transformed approximate polynomial by transforming the approximate polynomial, and perform the modular reduction based on the odd function property and the transformed approximate polynomial.

The processor may be configured to generate the transformed approximate polynomial by reducing a degree of the approximate polynomial.

The processor may be configured to generate the transformed approximate polynomial to have a domain corresponding to the square of a domain of the approximate polynomial.

The processor may be configured to determine a maximum degree of the transformed approximate polynomial based on a degree of the approximate polynomial, and generate the transformed approximate polynomial by dividing the approximate polynomial based on the maximum degree.

The processor may be configured to determine the maximum degree based on a depth of an operation of the approximate polynomial and a number of nonscalar multiplications for the ciphertext.

The processor may be configured to generate the transformed approximate polynomial by dividing the approximate polynomial based on one or more polynomial bases.

The polynomial bases may be the bases of the Chebyshev polynomials.

Other features and aspects will be apparent from the following detailed description, the drawings, and the claims.

BRIEF DESCRIPTION OF THE DRAWINGS

FIG. 3 illustrates an example of an algorithm for evaluating an approximate polynomial by the encryption apparatus of FIG. 1.

Figure 1:
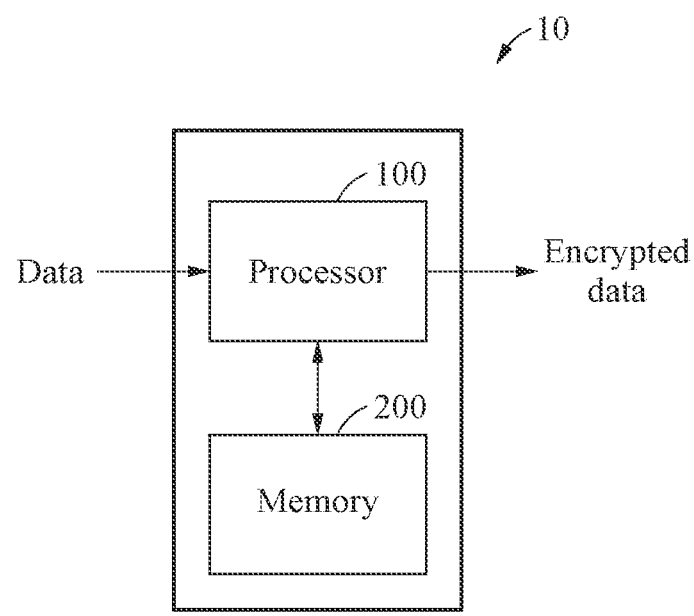
FIG. 1 illustrates an example of an encryption apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of an encryption apparatus.

Referring to FIG. 1, an encryption apparatus 10 may encrypt data. The encryption apparatus 10 may generate encrypted data through encryption of data. Hereinafter, the encrypted data may be referred to as a ciphertext.

The encryption apparatus 10 may perform encryption and decryption using homomorphic encryption. The encryption apparatus 10 may provide an encryption technique for performing an operation on data encrypted using homomorphic encryption without decryption. For example, the encryption apparatus 10 may decrypt a result of operating data encrypted using homomorphic encryption, thereby deriving the same result as an operation on data of a plain text. The encryption apparatus 10 may provide homomorphic encryption operations for real or complex numbers.

The encryption apparatus 10 may perform bootstrapping required for homomorphic encryption. The encryption apparatus 10 may generate an approximate polynomial that approximates a function corresponding to a modular reduction required for homomorphic encryption.

The encryption apparatus 10 may find a minimax approximation error for each degree of an optimal minimax approximate polynomial.

The encryption apparatus 10 may find an approximate polynomial that optimally approximates a modular reduction operation, thereby providing excellent performance in terms of the minimax approximation error of homomorphic encryption.

The encryption apparatus 10 may generate an approximate polynomial that approximates the modular reduction function based on approximation region information for approximating the modular reduction function. The encryption apparatus 10 may perform the modular reduction based on an odd function property. The encryption apparatus 10 may perform bootstrapping by performing the modular reduction based on the odd function property.

The encryption apparatus 10 includes a processor 100 and a memory 200.

The processor 100 may process data stored in the memory. The processor 100 may execute a computer-readable code (for example, software) stored in the memory 200 and instructions triggered by the processor 100.

The "processor 100" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 100 may generate a ciphertext by encrypting data. The processor 100 may bootstrap the ciphertext by performing a modular reduction based on an odd function property for a modulus corresponding to the ciphertext.

The processor 100 may obtain an approximate polynomial that approximates the modular reduction. The processor 100 may generate a transformed approximate polynomial by transforming the approximate polynomial.

The processor 100 may generate the transformed approximate polynomial by reducing a degree of the approximate polynomial. The processor 100 may generate the transformed approximate polynomial to have a domain corresponding to the square of a domain of the approximate polynomial.

The processor 100 may determine a maximum degree of the transformed approximate polynomial based on the degree of the approximate polynomial. The processor 100 may determine the maximum degree based on a depth of an operation of the approximate polynomial and the number of nonscalar multiplications for the ciphertext.

The processor 100 may generate the transformed approximate polynomial by dividing the approximate polynomial based on the determined maximum degree. The processor 100 may generate the transformed approximate polynomial by dividing the approximate polynomial based on one or more polynomial bases. In this example, the polynomial bases may be the bases of the Chebyshev polynomials.

The processor 100 may perform the modular reduction based on the odd function property and the transformed approximate polynomial.

The memory 200 may store instructions (or programs) executable by the processor 100. For example, the instructions may include instructions to perform an operation of the processor 100 and/or an operation of each element of the processor 100.

The memory 200 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Hereinafter, the process of transforming the approximate polynomial will be described in detail with reference to FIGS. 2 and 3.

Figure 2:
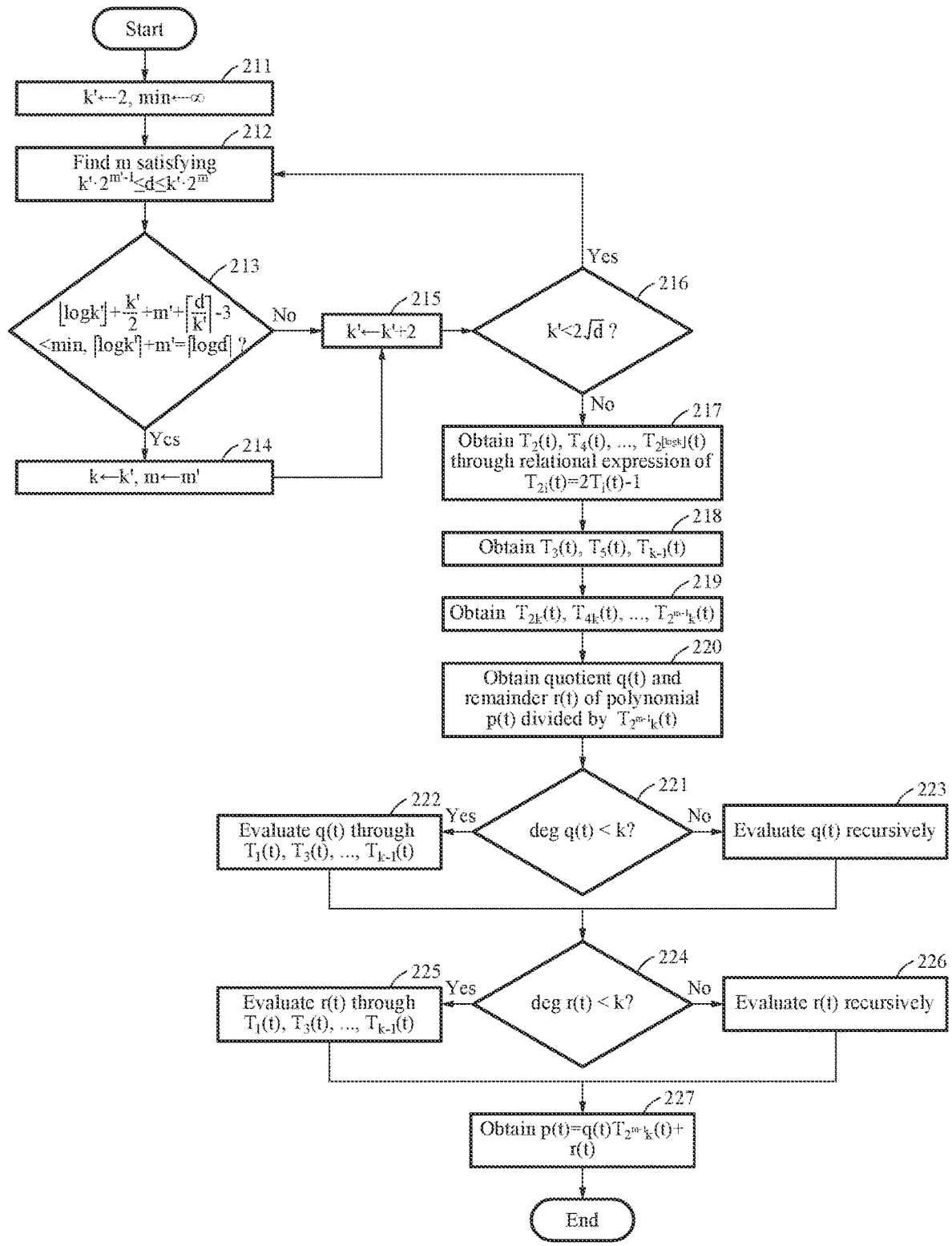
FIG. 2 illustrates an example of evaluating an approximate polynomial by the encryption apparatus of FIG. 1.

FIG. 2 illustrates an example of evaluating an approximate polynomial by the encryption apparatus of FIG. 1, and FIG. 3 illustrates an example of an algorithm for evaluating an approximate polynomial by the encryption apparatus of FIG. 1.

Referring to FIGS. 2 and 3, the encryption apparatus 10 may directly evaluate an approximate polynomial that approximates a modular reduction function.

There may be a trade-off between a degree of the approximate polynomial and a minimax approximation error. The processor 100 may transform the approximate polynomial that approximates the modular reduction function, thereby reducing the running time of evaluating the approximate polynomial.

For example, the processor 100 may evaluate the modular reduction function by changing the form of the approximate polynomial that approximates the modular reduction function using the Paterson-Stockmeyer algorithm or the baby-step giant-step algorithm.

The processor 100 may transform the obtained approximate polynomial using the odd function property, thereby increasing the evaluation rate. For the minimax approximate polynomial of an odd function, the processor 100 may increase the rate of evaluating the approximate polynomial using the odd function property.

For bootstrapping in homomorphic encryption, the processor 100 may approximate a normalized modular reduction function on near integers. In this example, the normalized modular reduction function may have an odd function property.

Thus, when obtaining the coefficients of the approximate polynomial, the processor 100 may just consider the coefficients of odd degree terms. Through this, the processor 100 may reduce the running time of modular reduction.

The evaluation of the approximate polynomial may be performed on a ciphertext region. Thus, the running time of evaluating the approximate polynomial may occupy a large proportion of the entire encryption and decryption process. The processor 100 may perform the modular reduction by evaluating the approximate polynomial each time bootstrapping is performed.

The processor 100 may use the odd function property of the approximate polynomial to reduce the number of nonscalar multiplications. The nonscalar multiplications may include multiplications between ciphertexts.

The processor 100 may transform the approximate polynomial using two schemes. First, when the Paterson-Stockmeyer algorithm is applied, the processor 100 may transform the approximate polynomial to reduce the number of nonscalar multiplications. The processor 100 may reduce the number of nonscalar multiplications by 30% with the odd function property of the approximate polynomial of the modular reduction function.

The processor 100 may transform the approximate polynomial using Equation 1.

$$f(\chi) = \chi g(\chi) \qquad \text{[Equation 1]}$$

The processor 100 may generate a transformed approximate polynomial by reducing a degree of the approximate polynomial, as expressed by Equation 1. The processor 100 may generate the transformed approximate polynomial to have a domain corresponding to the square of a domain of the approximate polynomial.

The processor 100 may transform an approximate polynomial $f(\chi)$ of degree $2n+1$ to a polynomial $g(\chi)$ of degree $n$ using the odd function property. The coefficient of $i$-th term of $g(\chi)$ may be equal to that of $(2i+1)$-th term of $f(\chi)$.

Through the above transformation, the processor 100 may evaluate an n-th degree polynomial $g(\chi)$, square $\chi$ and replace for $g(\chi)$, and multiply with $\chi$ at the last time.

Through this, the processor 100 may reduce the number of nonscalar multiplications from $\sqrt{2n}+O(\log n)$ to $\sqrt{n}+O(\log n)$, which results in the number of nonscalar multiplications being reduced by 30%.

The processor 100 may consume one more depth for an approximate polynomial of higher degree through the approximate polynomial transformation, thereby reducing the number of nonscalar multiplications.

Secondly, the processor 100 may use the baby-step giant-step algorithm to transform the approximate polynomial. Through the second scheme, the processor 100 may reduce the running time of modulus reduction without consuming any additional depth.

The processor 100 may determine a maximum degree of the transformed approximate polynomial based on the degree of the approximate polynomial. The processor 100 may determine the maximum degree based on a depth of an operation of the approximate polynomial and the number of nonscalar multiplications for the ciphertext.

Operations 211 to 216 of FIG. 2 may be the process of determining the maximum degree of the transformed approximate polynomial, and operations 217 to 227 may be the process of transforming the approximate polynomial based on the determined maximum degree. Algorithm 1 of FIG. 3 may correspond to operations 217 to 227 of FIG. 2.

The processor 100 may determine the maximum degree before bootstrapping, and perform only the operation of performing a modular reduction using the determined maximum degree during the actual bootstrapping process. In other words, the process of operations 211 to 216 may be performed before bootstrapping.

The processor 100 may determine a maximum degree of the transformed approximate polynomial based on the degree of the approximate polynomial. The processor 100 may determine the maximum degree based on a depth of an operation of the approximate polynomial and the number of nonscalar multiplications for the ciphertext.

In operation 211, the processor 100 may replace k' with 2 and min with $\infty$. In operation 212, the processor 100 may obtain m' satisfying $k' \cdot 2^{m'-1} \leq d \leq k' \cdot 2^{m'}$. Then, in operation 213, the processor 100 may determine whether the value of $$\lfloor \log k' \rfloor + \frac{k'}{2} + m' + \left\lceil \frac{d}{k'} \right\rceil - 3$$

is less than min and satisfies $\lceil \log k' \rceil + m' = \lceil \log d \rceil$.

In this example, the value of $$\lfloor \log k' \rfloor + \frac{k'}{2} + m' + \left\lceil \frac{d}{k'} \right\rceil - 3$$

denotes the number of nonscalar multiplications, and $\lceil \log k' \rceil + m'$ denotes the depth of operation. In other words, the processor 100 may determine k and m by determining whether the minimum value is less than the number of nonscalar multiplications and whether the depth of operation satisfies the condition of $\lceil \log k' \rceil + m' = \lceil \log d \rceil$, thereby determining the maximum degree of the Chebyshev polynomials for approximate polynomial transformation.

If the condition of operation 213 is satisfied, the processor 100 may replace k with k' and m with m' in operation 214. If the condition of operation 213 is not satisfied, the processor 100 may replace k' with k'+2, in operation 215.

In operation 216, the processor 100 may determine whether $k' < 2\sqrt{d}$. If the condition of operation 216 is satisfied, operation 212 may be repeated.

If the condition of operation 216 is not satisfied (or if $k' \geq 2\sqrt{d}$), the processor 100 may evaluate $T_2(t), T_4(t), \ldots, T_{2^{\lfloor \log k \rfloor}}(t)$ using the relational expression of $T_{2i}(t)=2T_i(t)^2-1$, in operation 217.

In operation 218, the processor 100 may evaluate $T_3(t), T_5(t), \ldots, T_{k-1}(t)$. Then, in operation 219, the processor 100 may evaluate $T_{2k}(t), T_{4k}(t), \ldots, T_{2^{m-1}k}(t)$. In operation 220, the processor 100 may calculate the quotient q(t) and the remainder r(t) of p(t) divided by $T_{2^{m-1}k}(t)$.

In operation 221, the processor 100 may determine whether the degree of q(t) is less than k. If the condition of operation 221 is satisfied, the processor 100 may evaluate q(t) with $T_1(t), T_3(t), T_5(t), \ldots, T_{k-1}(t)$, in operation 222. If the condition of operation 221 is not satisfied (or if the degree of q(t) is greater than or equal to k), the processor 100 may recursively evaluate q(t), in operation 223.

In operation 224, the processor 100 may determine whether the degree of r(t) is less than k. If the condition of operation 224 is satisfied, the processor 100 may evaluate r(t) with $T_1(t), T_3(t), T_5(t), \ldots, T_{k-1}(t)$, in operation 225. If the condition of operation 224 is not satisfied (or if the degree of r(t) is greater than or equal to k), the processor 100 may recursively evaluate r(t) in operation 226.

If the evaluation of q(t) and r(t) is completed, the processor 100 may evaluate $p(t)=q(t)T_{2^{m-1}k}(t)+r(t)$, in operation 227.

When f is a polynomial having arbitrary odd degree terms, and g is a polynomial having even degree terms, if f=gq+r under the condition of deg r<deg g, q and r may be both polynomials having odd degree terms.

The processor 100 may recursively use a polynomial corresponding to the quotient and a polynomial corresponding to the remainder when dividing the approximate polynomial by the even-degree Chebyshev polynomials.

Since the approximate polynomial is an odd function as described above and the even-degree Chebyshev polynomials are even functions, the polynomials corresponding to the quotient and the remainder may be both odd functions.

The processor 100 may divide, through a number of successive divisions, the approximate polynomial into the Chebyshev polynomials which are odd functions. Then, the processor 100 may not use the even-degree Chebyshev polynomials and thus, may not have to evaluate the even-degree Chebyshev polynomials. Since the even degree terms are not calculated, the processor 100 may reduce the number of nonscalar multiplications.

In the original baby-step giant-step algorithm, the length of baby steps is a power of two. However, the processor 100 may perform baby steps with the length of any positive integers using the odd function property of the approximate polynomial. Through this, the processor 100 may optimize the number of nonscalar multiplications more finely without consuming the additional depths.

In the odd function case, the length of baby steps is restricted to be positive even integers, in that the giant step Chebyshev polynomials have to be even functions. If the degree of the approximate polynomial is d and the length of baby steps is k, the number of nonscalar multiplications may be $$k + m + \left\lceil \frac{d}{k} \right\rceil - 3,$$

and the depth may be $\lceil \log k \rceil + m$ in the original baby-step giant-step algorithm.

In the odd function case, the number of nonscalar multiplications may be $$\lfloor \log k \rfloor + \frac{k}{2} + m + \left\lceil \frac{d}{k} \right\rceil - 3,$$

and the depth may be $\lceil \log k \rceil + m$. The processor 100 may reduce the number of nonscalar multiplications by at most 20% compared to the baby-step giant-step algorithm by using the odd function property of the approximate polynomial, without consuming any additional depth.

Hereinafter, the process of obtaining the approximate polynomial that approximates the modular reduction function by the processor 100 will be described in detail.

The processor 100 may obtain an approximate polynomial that approximates the modular reduction function. The function to be obtained through approximation by the processor 100 may be a normalized modular reduction function defined in only near finitely many integers as expressed by Equation 2.

$$normod(x) = x - round(x), x \in \bigcup_{i=-(K-1)}^{K-1} [i-\epsilon, i+\epsilon] \quad \text{[Equation 2]}$$

Equation 2 may express the modular reduction function scaled for both its domain and range.

The processor 100 may use the cosine function to approximate normod($\chi$) to use double-angle formula for efficient homomorphic evaluation.

If the double-angle formula is used $\ell$ times, the cosine function in Equation 3 may need to be approximated.

$$\cos\left(\frac{2\pi}{2^\ell}\left(x-\frac{1}{4}\right)\right), x \in \bigcup_{i=-(K-1)}^{K-1} [i-\epsilon, i+\epsilon] \quad \text{[Equation 3]}$$

To approximate the piecewise continuous functions including the functions of Equations 2 and 3, the processor 100 may assume a general piecewise continuous function defined on a union of finitely many closed intervals, which is given as Equation 4.

$$D = \bigcup_{i=1}^{t} [a_i, b_i] \subset [a, b] \subset \mathbb{R} \quad \text{[Equation 4]}$$

Here, $a_i < b_i < a_{i+1} < b_{i+1}$ for all $i=1, \ldots, t-1$.

To approximate a given piecewise continuous function with a polynomial having a degree less than or equal to d on D of Equation 4, the processor 100 may set a criterion for selecting new d+2 reference points from among multiple extreme points.

The processor 100 may generate an approximate polynomial by using $\{g_1, \ldots, g_n\}$ satisfying the Haar condition on [a, b] as the basis of polynomial. The processor 100 may obtain the minimax approximate polynomial in regard to the set of reference points for each iteration, and select a new set of reference points for next iteration.

There may be many cases where the processor 100 selects n+1 points from among extreme points of an error function evaluated using the arbitrary polynomial obtained using the set of reference points. The processor 100 may consider many intervals during the encryption process, and thus there may be lots of candidate extreme points.

The processor 100 may select n+1 target points from among many candidate points for each iteration to minimize the number of iterations. Through this, the processor 100 may generate the minimax approximate polynomial by converging the approximate polynomial generated for each iteration. In this example, the finally generated minimax approximate polynomial may be the approximate polynomial of the modular reduction described above.

In order to set the criterion for selecting n+1 target points, the processor 100 may define the function of Equation 5.

$$\mu_{p,f}(x) = \begin{cases} 1 & p(x) - f(x) \text{ is a local maximum value at } x \text{ on } D \\ -1 & p(x) - f(x) \text{ is a local minimum value at } x \text{ on } D \\ 0 & \text{otherwise} \end{cases} \quad \text{[Equation 5]}$$

Here, p($\chi$) denotes an arbitrary polynomial obtained in each iteration, and f($\chi$) denotes a piecewise continuous function to be approximated. For convenience, $\mu_{p,f}$ may be hereinafter referred to as $\mu$.

The processor B may obtain all extreme points of p($\chi$)−f($\chi$) into a set B. B may be a finite et and expressed as B={$\chi_1, \chi_2, \ldots, \chi_m$}. The processor 100 may select a point in an interval in B.

Assuming that B is ordered in increasing order, $\chi_1 < \chi_2 < \ldots < \chi_m$, then the values of $\mu$ may be 1 or −1. The number of extreme points may satisfy m≥n+1.

The processor 100 may define a set of functions $\mathcal{S}$ as expressed in Equation 6.

$$\mathcal{S}=\{\sigma: [n+1] \to [m] | \sigma(i) < \sigma(i+1) \text{ for all } i=1, \ldots, n\} \quad \text{Equation 6}$$

In this example, the set $\mathcal{S}$ may include only the identity function if n+1=m.

The processor 100 may set three criteria for selecting n+1 extreme points.

The processor 100 may set a local extreme value condition as the first condition. If E is the absolute error at the set reference points, the condition of Equation 7 may be set.

$$\min_i \mu(x_{\sigma(i)})(p(x_{\sigma(i)}) - f(x_{\sigma(i)})) \geq E \quad \text{[Equation 7]}$$

To satisfy the local extreme value condition, the processor 100 may remove the extreme points if the local maximum value of p($\chi$)−f($\chi$) is negative or the local minimum value of p($\chi$)−f($\chi$) is positive.

Secondly, the processor 100 may set an alternating condition. In other words, the condition of Equation 8 may be set. In detail, if one of two adjacent extreme points has a local maximum value, the other extreme point may have a local minimum value.

$$\mu(x_{\sigma(i)}) \cdot \mu(x_{\sigma(i+1)}) = -1 \text{ for } i=1, \ldots, n \quad \text{[Equation 8]}$$

Thirdly, the processor 100 may set a maximum absolute sum condition. The processor 100 may select $\sigma$ maximizing the value of Equation 9 from among $\sigma$ satisfying the local extreme value condition and the alternating condition.

$$\sum_{i=1}^{n+1} |p(x_{\sigma(i)}) - f(x_{\sigma(i)})| \quad \text{[Equation 9]}$$

The absolute error value at current reference points $\chi_1, \ldots, \chi_{n+1}$ may be less than the minimax approximation error, and converge to the minimax approximation error as the number of iterations increases.

Further, the absolute error value at the current reference points may be a weighted average of the absolute error values of the approximate polynomial in the previous iteration at $\chi_1, \ldots, \chi_{n+1}$.

The processor 100 may help for the absolute error value at the current reference points to converge to the minimax approximation error fast, using the maximum absolute sum condition. The processor 100 may apply the maximum absolute sum condition, thereby expediting the convergence to the minimax approximate polynomial.

The set $\mathcal{S}$ always contains at least one element $\sigma_0$ that satisfies the local extreme value condition and the alternating condition, and may have $\sigma_0(i_0)$ satisfying $|p(\chi_{\sigma_0(i_0)}) - f(\chi_{\sigma_0(i_0)})| = \|p - f\|_\infty$ for some $i_0$.

The processor 100 may find coefficients of the approximate polynomial with a power basis at the current reference points for the continuous function $f(\chi)$. That is, the processor 100 may generate an approximate polynomial by obtaining the values of the coefficient $c_j$ in Equation 10.

$$\sum_{j=0}^{d} c_j x_i^j - f(x_i) = (-1)^i E \qquad \text{[Equation 10]}$$

Here, E may be an unknown in a linear equation. As the degree of basis of an approximate polynomial increases, the coefficients may decrease. The processor 100 may need to set a higher precision for the coefficients of a higher degree basis.

Thus, the processor 100 may effectively solve the precision problem by using the basis of Chebyshev polynomials as the basis of the approximate polynomial. Since the coefficients of a polynomial with the Chebyshev basis usually have almost the same order, the processor 100 may generate the approximate polynomial using the Chebyshev basis instead of the power basis.

The Chebyshev polynomials satisfy the Haar condition described above, and the processor 100 may obtain the approximate polynomial by calculating $c_j$ and E by solving the system of d+2 linear equations of Equation 11 using d+2 reference points.

$$\sum_{j=0}^{d} c_j T_j(x_i) - f(x_i) = (-1)^i E \qquad \text{[Equation 11]}$$

Figure 4:
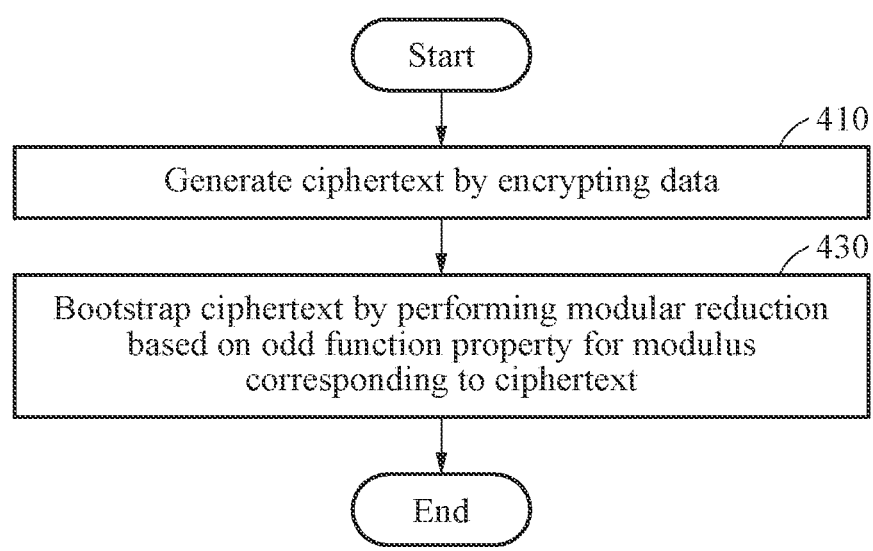
FIG. 4 illustrates an example of an operation of the encryption apparatus of FIG. 1.

FIG. 4 illustrates an example of an operation of the encryption apparatus of FIG. 1.

Referring to FIG. 4, in operation 410, the processor 100 may generate a ciphertext by encrypting data. In operation 430, the processor 100 may bootstrap the ciphertext by performing a modular reduction based on an odd function property for a modulus corresponding to the ciphertext.

The processor 100 may obtain an approximate polynomial that approximates the modular reduction. The processor 100 may generate a transformed approximate polynomial by transforming the approximate polynomial.

The processor 100 may perform bootstrapping by approximating the modular reduction based on an odd function property. The processor 100 may evaluate the obtained approximate polynomial based on the odd function property, thereby reducing the bootstrapping time.

The processor 100 may generate the transformed approximate polynomial by reducing a degree of the approximate polynomial. The processor 100 may generate the transformed approximate polynomial to have a domain corresponding to the square of a domain of the approximate polynomial.

The processor 100 may determine a maximum degree of the transformed approximate polynomial based on the degree of the approximate polynomial. The processor 100 may determine the maximum degree based on a depth of an operation of the approximate polynomial and the number of nonscalar multiplications for the ciphertext.

The processor 100 may generate the transformed approximate polynomial by dividing the approximate polynomial based on the determined maximum degree. The processor 100 may generate the transformed approximate polynomial by dividing the approximate polynomial based on one or more polynomial bases. In this example, the polynomial bases may be the bases of the Chebyshev polynomials.

The processor 100 may perform the modular reduction based on the odd function property and the transformed approximate polynomial.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An encryption method using homomorphic encryption, the encryption method comprising:
   generating a ciphertext by encrypting data; and
   bootstrapping the ciphertext by performing a modular reduction based on an odd function property for a modulus corresponding to the ciphertext,
   wherein the bootstrapping comprises bootstrapping the ciphertext by transforming an obtained approximate polynomial that approximates the modular reduction based on the odd function property, and performing the modular reduction based on the odd function property and the transformed approximate polynomial.

2. The encryption method of claim 1, wherein the generating of the transformed approximate polynomial comprises generating the transformed approximate polynomial by reducing a degree of the approximate polynomial.

3. The encryption method of claim 2, wherein the reducing the degree of the approximate polynomial comprises generating the transformed approximate polynomial to have a domain corresponding to the square of a domain of the approximate polynomial.

4. The encryption method of claim 1, wherein the generating of the transformed approximate polynomial comprises:
   determining a maximum degree of the transformed approximate polynomial based on a degree of the approximate polynomial; and
   generating the transformed approximate polynomial by dividing the approximate polynomial based on the maximum degree.

5. The encryption method of claim 4, wherein the determining of the maximum degree comprises determining the maximum degree based on a depth of an operation of the approximate polynomial and a number of nonscalar multiplications for the ciphertext.

6. The encryption method of claim 5, wherein the generating of the transformed approximate polynomial comprises generating the transformed approximate polynomial by dividing the approximate polynomial based on one or more polynomial bases.

7. The encryption method of claim 6, wherein the polynomial bases are the bases of the Chebyshev polynomials.

8. A non-transitory computer-readable storage medium storing instructions that, when executed by a processor, cause the processor to perform the encryption method of claim 1.

9. An encryption apparatus using homomorphic encryption, the encryption apparatus comprising:
   a processor configured to generate a ciphertext by encrypting data, and to bootstrap the ciphertext by performing a modular reduction based on an odd function property for a modulus corresponding to the ciphertext; and
   a memory configured to store instructions to be executed by the processor,
   wherein the processor is configured to bootstrap the ciphertext by transforming an obtained approximate polynomial that approximates the modular reduction based on the odd function property, and perform the modular reduction based on the odd function property and the transformed approximate polynomial.

10. The encryption apparatus of claim 9, wherein the processor is configured to generate the transformed approximate polynomial by reducing a degree of the approximate polynomial.

11. The encryption apparatus of claim 10, wherein the processor is configured to generate the transformed approximate polynomial to have a domain corresponding to the square of a domain of the approximate polynomial.

12. The encryption apparatus of claim 9, wherein the processor is configured to:
   determine a maximum degree of the transformed approximate polynomial based on a degree of the approximate polynomial, and
   generate the transformed approximate polynomial by dividing the approximate polynomial based on the maximum degree.

13. The encryption apparatus of claim 12, wherein the processor is configured to determine the maximum degree based on a depth of an operation of the approximate polynomial and a number of nonscalar multiplications for the ciphertext.

14. The encryption apparatus of claim 13, wherein the processor is configured to generate the transformed approximate polynomial by dividing the approximate polynomial based on one or more polynomial bases.

15. The encryption apparatus of claim 14, wherein the polynomial bases are the bases of the Chebyshev polynomials.

* * * * *